United States Patent [19]

Jeram et al.

[11] 4,011,929
[45] Mar. 15, 1977

[54] DAMPENING DEVICE USING A SILICONE RUBBER

[75] Inventors: Edward M. Jeram, Burnt Hills; Richard A. Striker, Troy, both of N.Y.

[73] Assignee: General Electric Company, Waterford, N.Y.

[22] Filed: May 2, 1975

[21] Appl. No.: 573,827

[52] U.S. Cl. .......................... 188/268; 260/46.5 G
[51] Int. Cl.² .................................. F16F 9/30
[58] Field of Search ............. 188/268; 260/46.5 G, 260/46.5 UA

[56] References Cited
UNITED STATES PATENTS

| | | | |
|---|---|---|---|
| 2,398,187 | 4/1946 | McGregor et al. | 188/268 |
| 3,053,526 | 9/1962 | Kendall | 188/268 |
| 3,236,806 | 2/1966 | Dunham | 260/46.5 G |
| 3,236,872 | 2/1966 | Manly et al. | 260/46.5 G |
| 3,652,711 | 3/1972 | Triem et al. | 260/46.5 UA |
| 3,690,423 | 9/1972 | Trongeau | 188/268 |
| 3,824,208 | 7/1974 | Link | 260/46.5 G |
| 3,843,601 | 10/1974 | Bruner | 260/46.5 UA |
| 3,876,044 | 4/1975 | Kendall et al. | 188/268 |

*Primary Examiner*—Trygve M. Blix
*Assistant Examiner*—Edward R. Kazenske
*Attorney, Agent, or Firm*—John L. Young; E. Philip Koltos; Edward A. Hedman

[57] ABSTRACT

There is provided a new improved dampening medium for a shock dampening device. The dampening device comprises a closed chamber, a movable piston rod extending through the chamber and an enlarged piston head located on the piston rod. Located in the interior space of the closed chamber under pressure is a compressible solid, fragmented, particulate mass of cured unfilled silicone rubber composition for producing a damping effect on the piston rod and head. The damper device includes a threaded plug for varying the internal static pressure on the compressible mass within the chamber and apertures extending through the piston head or an annular space between the outer edge of the piston head and the interior of the chamber for bypassing the compressible mass.

11 Claims, 2 Drawing Figures

DAMPENING DEVICE USING A SILICONE RUBBER

The present invention relates to an improvement in a device to dampen shocks. More particularly, it is concerned with providing an assembly comprising a movable piston rod with enlarged head within an enclosing chamber, and filling the remaining interior space of the chamber with a dampening composition comprising a cured unfilled silicone rubber compound in fragmented, particulate form.

BACKGROUND OF THE INVENTION

In McGregor et al, U.S. Pat. No. 2,398,187, incorporated herein by reference, there are disclosed compositions for use as dampening fluids in hydraulic machinery, such as shock absorbers, artillery recoil mechanisms, door checks, railroad car couplings, aircraft landing struts, and the like. These fluids comprise mainly silicone fluids, with the remainder of any liquid medium being an organic lubricant.

Almost all conventional shock absorber assemblies are based on the same principle, i.e., using an assembly comprising a movable member within an enclosing chamber and including at least one rubber seal means, the assembly being filled with a quantity of a hydraulic fluid composition for dampening. All such systems have certain disadvantages, one being that a fluid must be provided which does not lead to any substantial swelling of the rubber seal (See McGregor et al, for example).

Other disadvantages of damper systems which employ a fluid dampening medium are described in Kendall, U.S. Pat. No. 3,053,526, incorporated herein by reference. For instance, such fluid systems require exact machine tooling and high pressure seals to prevent leakage of the fluid. Also, while a fluid medium provides viscous damping and exponential velocity damping, it does not provide any significant friction damping.

Kendall indicates that if a compressible solid is used in a standard damper, instead of liquids or other fluids, it is possible to achieve various types of damping and other advantages which are not available from the use of liquids. For example, with the use of compressible solids, friction damping, as well as viscous and exponential velocity damping, can be obtained from the action of the solid on the movable damper piston. Moreover, Kendall indicates that when compressible solids are used there is no need for the exact machine tooling and high pressure seals required to overcome the leakage problems which a fluid medium presents.

It has been found that if the solid material is highly compressible, it is more useful as a damper because the greater the compressibility, the greater the ability of the compound to absorb energy and to return the movable piston to its original starting point. Silicone compounds are not only highly compressible, but possess the necessary wide temperature range stability which is required. Solid silicone rubber compounds of the prior art, however, contain fillers for reinforcement, such as silicas and ferric oxides, and these are relatively incompressible.

Applicants have now discovered a more compressible and more readily usable solid damper composition for an energy-absorbing assembly. Unlike conventional compositions applicants' invention is a one-part system which does not require mixing prior to curing. Moreover, applicants' system obviates the need for fillers. Thus a composition is provided which affords economic advantages and greater efficiency as compared to prior solid damper compositions. Applicants have also discovered that if the solid silicone mass is fragmented, it provides greater energy dissipating ability when impact is imparted to the damper assembly.

Such advantages lend themselves to important utility in heavy duty shock absorbing devices and particularly to heavy motive machinery shock damping and safety devices. A particularly important field of use is in automotive shock absorbers and especially automotive safety bumpers.

SUMMARY OF THE INVENTION

According to the present invention, there is provided in a damper comprising a closed chamber, a movable piston rod extending through the chamber, an enlarged piston head on the piston rod, a compressible solid mass located within the chamber for producing a damping effect on the rod and piston head, means associated with the piston head for bypassing the compressible solid mass, e.g., through and/or around the piston head, and means for varying the pressure on the compressible solid mass in the chamber within a pressure range which is required to produce frictional or shear damping on the piston rod, the improvement which comprises utilizing as the compressible solid a fragmented, particulate, cured, unfilled silicone rubber composition.

The chamber itself can be of uniform or varying diameter. The bypass means associated with the piston head, that is, located in or adjacent to the piston head, may consist of one or more apertures, or orifices, extending through the piston head itself, or it may consist of an annulus, or orifice, between the outer surface of the piston head and the interior surface of the chamber. Preferably, if the chamber has a cross section of varying diameter, the space between the outer edge of the piston head and the interior surface of the chamber will thus be an orifice of variable area depending on the position of the head within the chamber.

DESCRIPTION OF THE DRAWING

The invention is better understood by reference to the drawings, in which:

FIG. 2 shows a vertical cross-section of a damper according to this invention wherein the bypass means comprises apertures in the piston head. The embodiment of FIG. 2 comprises a shock absorber assembly adapted for use in automotive safety bumpers, and the like.

DETAILED DESCRIPTION OF THE INVENTION

Figure 1:
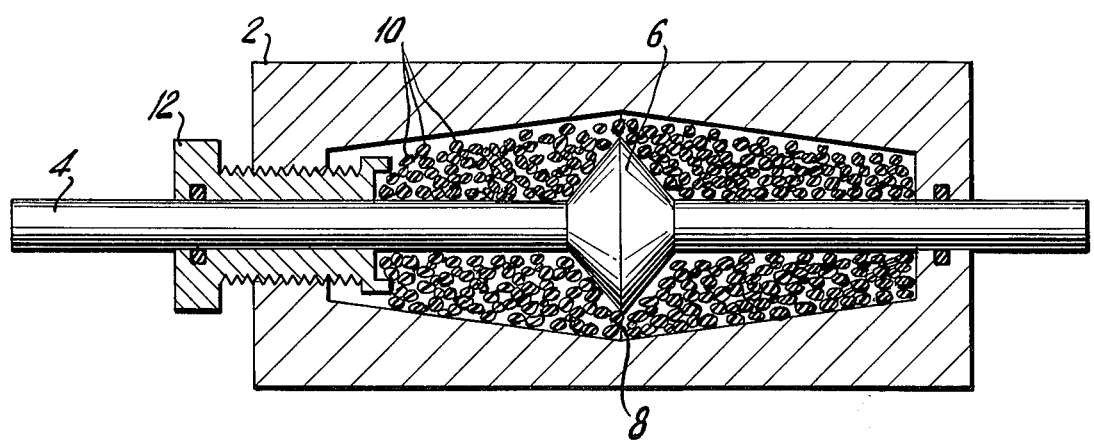
FIG. 1 shows a vertical cross-section of a damper according to this invention in which the by-pass means is an annulus.

Referring to FIG. 1, compressible particulate solid 10 is located within chamber 2. Piston rod 4 including piston head 6 thereon is movable through chamber 2. Annulus 8 of variable cross-sectional area is defined by the space between the interior wall of chamber 2 and the outer surface of piston head 6. The pressure of compressible particulate solid 10 on the rod, piston head and chamber walls is increased by screwing down threaded plug 12 until the desired degree of static pressure is achieved. Unthreading plug 12 will reduce the pressure. When piston rod 4 is activated, a corresponding motion is induced on head 6. Movement of head 6 through solid 10 is facilitated by transfer of the solid through annulus 8, whereby the by-pass effect is accomplished.

Figure 2:
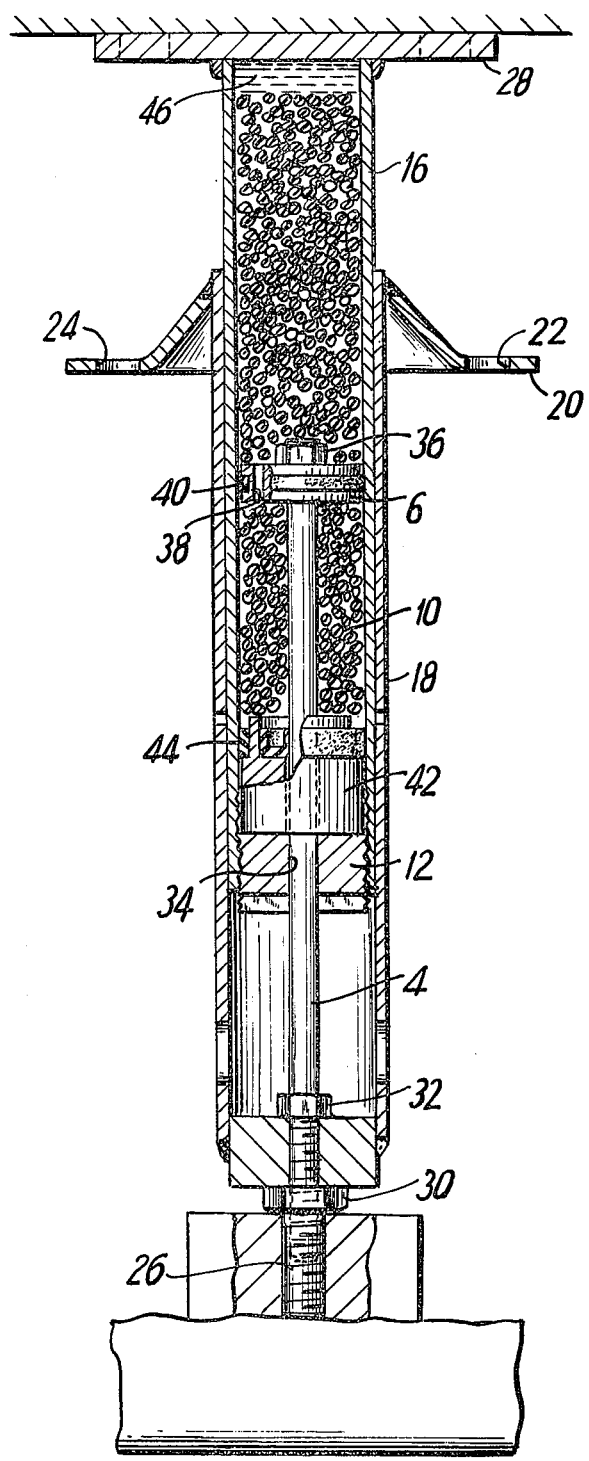

FIG. 2 illustrates another type of damping device within which the present composition can be used. This device is particularly adapted for use as a shock absorber in an automotive safety bumper.

Referring to FIG. 2, outer casing 18 is attached to a movable member, such as an automobile safety bumper (not shown), by means of flange 20, including mounting holes 22 and 24, and by means of threaded boss 26. Inner casing 16 is fixed to a stationary member, such as the frame of an automobile (not shown), by means of flange 28, which includes mounting holes. The interior space of inner casing 16 is filled with cured, unfilled silicone dampening composition 10, to be more fully described hereinafter. Some uncured silicone 46 is also present and is eventually distributed more evenly throughout the dampening medium as the device operates and performs as a lubricant for the device. Piston rod 4 is threaded into threaded bushing 30 which in turn is threaded into boss 26. Lock nut 32 securely fastens boss 26 to rod 4 thus preventing their further rotation. If an impact is imparted to the movable member, i.e., a bumper, to which outer casing 18 is attached, the force transmitted to outer casing 18 causes it to move relative to stationary inner casing 16. Piston rod 4, which extends through aperture 34 into casing 16, moves together with outer casing 18, to which it is securely fastened by boss 26, bushing 30 and lock nut 32. Piston head 6, threadedly fixed on rod 4 and fastened with lock nut 36, is pushed through compressible solid 10. The compressible solid is forced through aperture 38 and bypasses the piston head. Gasket 40 prevents transfer of the compressible solid through an annulus which would be defined by the outer surface of the piston head and the inner surface of casing 16, except for the gasket. Packing gland 42 and sealing gasket 44 prevent extrusion loss of the compressible solid. The static pressure on compressible solid 10 within casing 16 is varied by screwing down or up on threaded plug 12 into corresponding threads in casing 16.

If a more detailed description of the mechanics of damping mechanisms, including physical forces involved, is desired, it is available in the aforementioned Kendall patent, U.S. Pat. No. 3,053,526, which has been incorporated herein by reference.

It is the essence of the invention to provide that the composition of the solid rubber compound to be used within the chamber be first, un-filled, and, second, that it comprise, before curing, a polyorganosiloxane and a peroxide catalyst in the weight ratio of 100 parts of polyorganosiloxane to 0.1 to 2.0 parts of peroxide. Such a composition should have a low modulus after curing, so that the cured compound is weak and can be easily pulverized into fragments or particles of silicone rubber. Such a composition preferably will be based on a polyorganosiloxane comprising a major proportion of dimethyl siloxane units and minor proportions of methyl vinyl siloxane units and trimethyl siloxane units. Most preferably, the silicone rubber is produced by heat curing a composition comprising 100 parts of a polymer composition containing 95–99.5 mole % of dimethyl siloxane units, 0.05–2.0 mole % of methyl vinyl siloxane units, 0.001–5.0 mole % of trimethyl siloxane units and 0.1 to 2.0 parts by weight of a peroxide catalyst compound.

The peroxides are dispersed homogeneously in the curable silicone compound at temperatures at which the peroxides do not decompose, e.g., 25°–75° C. The compositions obtained in this way are then exposed to temperatures at which cross-linking takes place, e.g., 300°–450° F. As will be understood by those skilled in the art, the nature and amount of the peroxide selected will influence the processing conditions of the composition. In general, polyorganosiloxanes can be converted into rubber-elastic polymers by heating with a relatively small amount of organic peroxides. The types of peroxides which can be used for this purpose are: diaroyl peroxides, such as dibenzoyl peroxide, bis-p-chlorobenzoyl peroxide and bis-2,4-dichlorobenzoyl peroxide; dialkyl peroxides, such as 2,5 dimethyl -2,5- di (t-butyl peroxy) hexane; diaralkyl peroxides, such as dicumyl peroxide; alkylaryl peroxides; alkyl aroyl and alkyl acyl peroxides, such as t-butyl perbenzoate; or mixtures containing representatives of different types. The catalysts from the various groups differ in their optimum working temperatures as well as in their rates of cross-linking. The preferred catalyst is a dialkyl peroxide. Especially preferred is 2,5 dimethyl -2,5- di (t-butyl peroxy) hexane. These variables are well known. Specific examples are given hereinafter.

A useful general reference describing such technology is "Chemistry and Technology of Silicones," by Walter Noll, Academic Press, 1968, pages 230 to 231, the disclosure of which is incorporated herein by reference.

In providing the shock dampening devices according to this invention, the curing procedure which is preferred is to charge a mixture of the polyorganosiloxane and peroxide catalyst into a shock absorber chamber and then place the entire assembly in an oven for a time and at a temperature sufficient to produce a cured composition having a desired hardness, i.e., Shore A of from 7 to 15. Curing of the present composition at 300°–450° F for 15–90 minutes has been found to produce desired Shore A hardnesses. A plunger device (e.g., piston rod and head) is then inserted into the cured silicone rubber and the unit is "shocked" several times in order to pulverize the cured rubber composition into fragments or particles in situ. Then the assembly is completed by closing the chamber and exerting the desired static pressure, or by screwing down on a threaded plug, etc., as described above.

One assembly according to this invention is made as follows. An intimate blend of a silicone gum compound and a catalyst is prepared. The silicone gum compound is composed of the following units.

| 100.00 | moles | $(CH_3)_2$ SiO |
|---|---|---|
| 0.05–2.0 | moles | $(CH_2=CH)(CH_3)$SiO |
| 0.001–5.0 | moles | $(CH_3)_3$ Si$_{0.5}$ |

(General Electric Company, KOH catalyzed, $H_3PO_4$ neutralized polymer, 1,000–1,000,000 cps.). This polymer mixture should be kept at 50° C. or less in order to prevent premature reaction or decomposition of the peroxide catalyst. To 100 parts by weight of this gum is added 0.3 parts by weight of 2,5-dimethyl 2,5-di (t-butyl peroxy) hexane (Lucidol Division Pennwalt Corp., Lupersol 101) as a catalyst. The batch is then mixed well until homogeneous.

The resulting mixture is then charged into a damper assembly, or cylinder. The charged cylinder is placed in an oven for about 60 minutes at about 425° F. during which time the silicone composition cures to a low modulus rubber, and the peroxide decomposes to alcohol byproducts. The unit is next assembled by pushing the piston into the chamber, and the assembly is "shocked" several times in order to pulverize the rubber into granules of clear silicone rubber. The retaining plug is screwed down to cause the desired static pressure to be imposed on the rubber.

During an actual collision, the plunger is free to travel within the cylinder — but the compressed rubber in the cylinder efficiently returns the plunger to its original position making it ready for the next impact. Such an assembly is capable of handling pressures of up to 40,000 psi and elevated temperatures. However, the peroxide catalyst decomposes only to neutral byproducts and there is no tendency to revert to the precursor compounds.

The composition after catalyzation had a viscosity of 10,000–20,000 cps. at 25° C. After the composition was cured for about 1 hour at 425° F. it had a Shore A hardness in the range of 7–15.

The composition described above can also be stored in sealed containers for relatively long periods of time prior to curing and, when curing is desired, charged into a damper assembly, or cylinder, without the necessity for adding other ingredients prior to curing. Thus there is provided a one-part curable composition.

Obviously other compositions will suggest themselves to those skilled in the art in view of the above detailed description. Any of the enumerated peroxides can be substituted; and other silicone gums can be used. The important feature is not to include a non-compressible reinforcement, and to insure that a low modulus, easily fragmented product is produced. Although the invention lends itself especially to one-part systems, other conventional means to provide rubbers with the desired characteristics can be used. All obvious variations are within the full intended scope of the invention, which is defined in the appended claims.

We claim:

1. In a damper comprising a closed chamber, a movable piston rod extending through said chamber, an enlarged piston head on said rod, a compressible solid mass under pressure and located within said chamber for producing a damping force on said rod and piston head, a bypass means associated with said piston head providing for transfer of said compressible solid mass therethrough, and a means for varying the pressure of the compressible solid mass in said chamber within a pressure range required to produce damping on said rod, the improvement which comprises utilizing as said solid, an unfilled silicone rubber composition produced by curing a composition comprising 0.1–2.0 parts of peroxide catalyst to 100 parts of a polymer composition consisting of 95–99.5 mole % of dimethyl siloxane units, 0.05–2.0 mole % of methyl vinyl siloxane units, 0.001–5.0 mole % of trimethyl siloxane units, and said silicone rubber composition being fragmentable into particulate form after curing.

2. A damper as defined in claim 1 wherein said bypass means consists of one or more apertures extending through said piston head.

3. A damper as defined in claim 1 wherein said bypass means consists of a space between the interior surface of said chamber and the outer edge of said piston head defining an annulus, said chamber having a cross section of varying diameter so that the space between the interior of said chamber and the outer edge of said piston defines an annulus of variable area for the movement therethrough of said compressible solid mass.

4. A damper as defined in claim 1 adapted for use as a shock absorber.

5. A damper as defined in claim 1 adapted for use as a shock absorber in an automotive safety bumper.

6. A shock absorber as defined in claim 5 wherein said polymer composition, before curing, has a viscosity in the range between 5,000 and 30,000 cps. at 25° C.

7. A shock absorber as defined in claim 6 wherein said polymer composition, before curing, has a viscosity of about 10,000 to about 20,000 cps. at 25° C.

8. A shock absorber as defined in claim 6 wherein said silicone rubber composition has been cured by heating, in situ, for about 15 to 90 minutes at a temperature of from about 300° to about 450° F.

9. A damper as defined in claim 1 wherein said silicone rubber composition has been cured and fragmented in situ.

10. A damper as defined in claim 1 wherein said peroxide comprises 2,5 dimethyl -2,5- di (t-butyl peroxy) hexane.

11. A damper as defined in claim 10 wherein said silicone rubber composition has been cured for 15 to 90 minutes at a temperature of from 300° to 450° F., before fragmentation.

* * * * *

Disclaimer 4,011,929.—*Edward M. Jeram,* Burnt Hills, and *Richard A. Striker,* Troy, N.Y. DAMPENING DEVICE USING A SILICONE RUBBER. Patent dated Mar. 15, 1977. Diclaimer filed July 22, 1982, by the assignee, *General Electric Co.*

Hereby enters this disclaimer to the entire term of said patent.
[*Official Gazette September 14, 1982.*]